Jan. 28, 1964  K. F. ZIEGLER  3,119,277
GEAR SHIFT MECHANISM
Filed Dec. 19, 1960
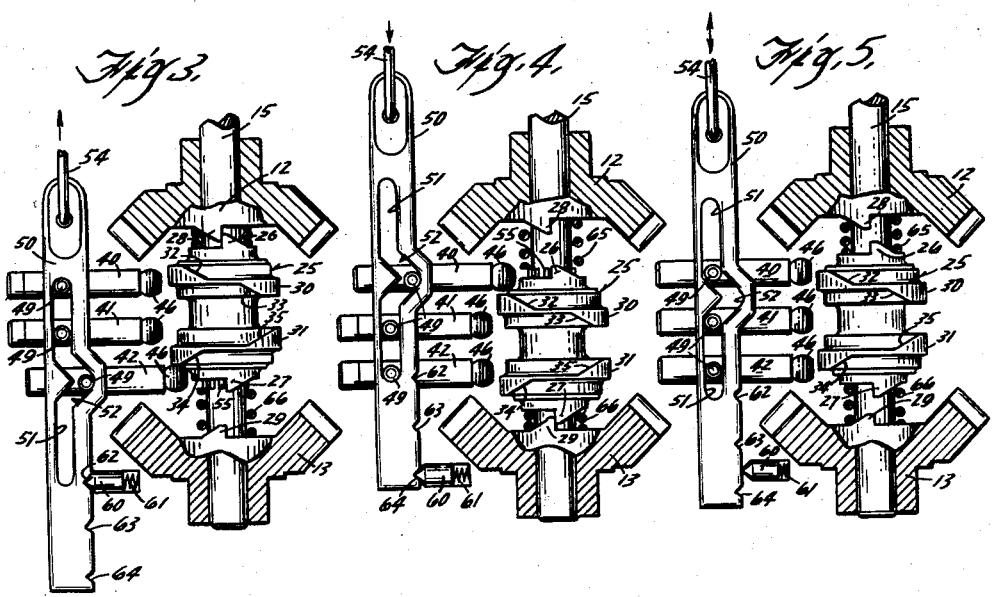
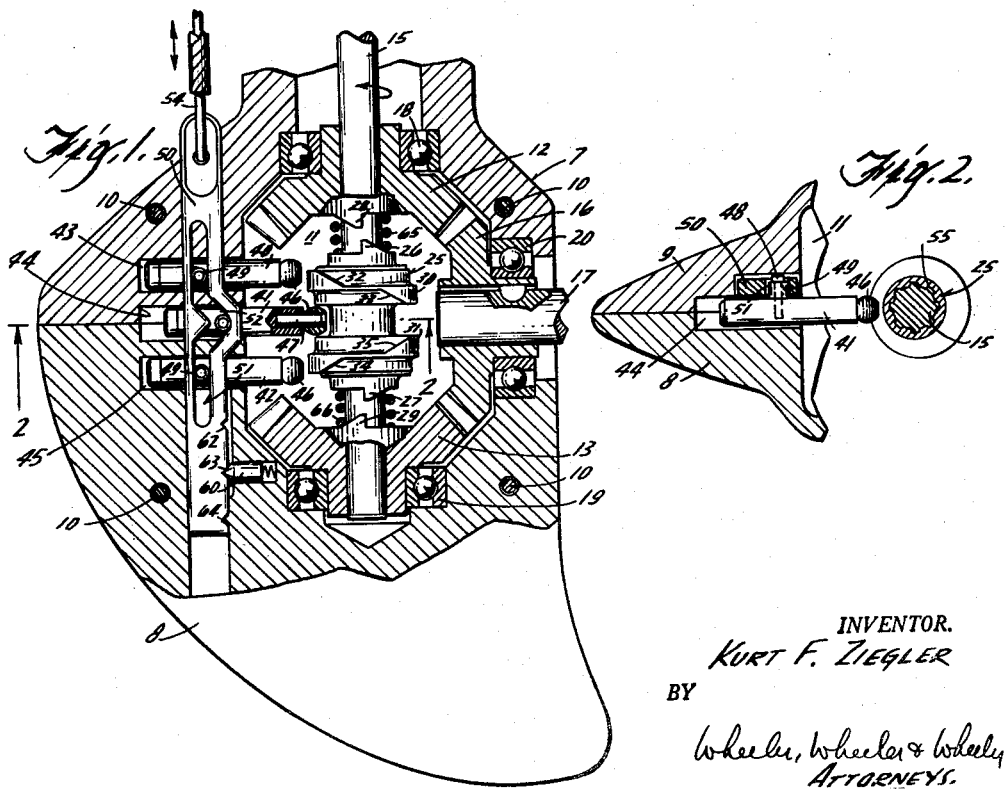
INVENTOR.
KURT F. ZIEGLER
BY
Wheeler, Wheeler & Wheeler
ATTORNEYS.

United States Patent Office 3,119,277
Patented Jan. 28, 1964

3,119,277
GEAR SHIFT MECHANISM
Kurt F. Ziegler, Zion, Ill., assignor to Outboard Marine Corporation, Waukegan, Ill., a corporation of Delaware
Filed Dec. 19, 1960, Ser. No. 76,936
4 Claims. (Cl. 74—337.5)

This invention relates to a gear shift mechanism.

The apparatus is designed to permit manual control to be exercised from a remote point and with minimum manual energy, motion preferably being transmitted to the control part by means of a Bowden wire or the like. The manually operable control part cams one or another cam plunger into position where its terminal portion may be engaged by an axially pitched cam surface on the periphery of a clutch collar, whereby the plunger thus engaged will cause the dog to move axially to or from clutching engagement.

By way of exemplification, I have shown the invention embodied in a reversing gear mechanism in the lower unit of an outboard motor. A clutch collar is reciprocable axially of the drive shaft to engage clutch jaws at its ends selectively with forward or reverse gears which are otherwise free of the drive shaft and are meshed with a driven gear on the propeller shaft.

The collar has peripheral cam flanges which are spaced to receive a neutralizing plunger and have axially flaring portions respectively engageable by control plungers which, when thus engaged, cause the collar to move on its splines axially of the drive shaft into clutching engagement with the respective gears for forward or reverse propulsion of the propeller shaft.

The respective plungers are advanced and retracted by means of a slide which has a cam slot engaged with rollers on the respective plungers. The only energy required for the manual control is to reciprocate this slide and advance and retract the plunger. The actual shifting movement of the collar to engage its clutch jaws with those of the respective gears is provided by the power of the drive shaft itself acting through the camming flanges on the ends of the respective control plunger which is advanced by the slide.

In the drawings:

FIG. 1 is a diagrammatic view showing portions of an outboard motor unit in vertical axial section, the control mechanism and the clutches operated thereby being diagrammatically illustrated in elevation, with parts broken away.

FIG. 2 is a fragmentary detail view taken in section on the line 2—2 of FIG. 1.

FIG. 3 is a fragmentary diagrammatic view in side elevation of portions of the clutch and control mechanism in the relative positions which they assume when reverse operation is desired.

FIG. 4 is a view similar to FIG. 3 showing the relative positions as assumed by the parts in a forward clutching position.

FIG. 5 is a view similar to FIG. 3 showing an intermediate position in which all of the control plungers are retracted.

It will be understood that the invention is applicable to the engagement and disengagement of a single clutch and that it is not required that the invention be used in an outboard motor. The choice of a reversing gear set and appropriate clutch mechanism and the illustration of this organization in connection with outboard motor parts is solely by way of exemplification.

For the purposes hereof, it is assumed that the gear housing 7 comprises separable parts 8 and 9 held together by any appropriate means such as the bolts 10. The gear casing cavity 11 houses driving gears 12 and 13 on a drive shaft 15. The driving gears 12 and 13 mesh with a driven gear 16 on the propeller shaft 17. Suitable bearings are provided at 18, 19 and 20.

To control the direction of rotation of propeller shaft 17, and the gear 16 fixed thereto, the gears 12 and 13 are selectively clutched to the drive shaft 15 by means of a shiftable collar 25 splined to the drive shaft 15 and provided at its ends with clutch teeth 26 and 27 selectively engageable respectively with complementary clutch teeth 28 on gear 12 and complementary clutch teeth 29 on gear 13.

The present invention is particularly concerned with a means for using power of the constantly rotating drive shaft 15 to effect the shifting movements of the clutch collar 25 between its forward, neutral and reverse positions. To this end, clutch collar 25 is provided with similar but allochiral peripheral flanges 30 and 31 which have corresponding portions axially offset. Thus, the outer face of peripheral flange 30 is beveled axially outwardly at 32 and axially inwardly at 33. Similarly, the annular flange 31 is beveled axially outwardly at 34 and axially inwardly at 35. The points at which the flanges 30 and 31 are closest to each other are spaced bodily from each other for the full width of one of the operating plungers hereinafter to be described.

The plungers 40, 41 and 42 are mutually spaced and suitably guided for reciprocation to and from the drive shaft 15. In the present exemplication, the plungers are guided in tubular sockets 43, 44 and 45, respectively. Each of the plungers is desirably provided with a ball-shaped head 46 which may be connected thereto by means of a pin 47 as shown in FIG. 1. In this view, the pin is exposed by breaking away portions of plunger 41.

Projecting laterally from each plunger is a post 48 rotatably supporting a cam follower roller 49. The slide 50 has a cam track at 51 with an offset portion at 52 which may be registered selectively with any of the rollers of the respective plungers to advance the plunger in its socket. In the position of the parts shown in FIG. 1, the cam follower roller 49 of the central plunger 41 is in registry with the offset portion of the cam slot 51, whereby the plunger 41 is advanced toward drive shaft 15.

Plunger 41 is centered between the two flanges 30 and 31 of the clutch collar 25. Thus, with plunger 41 advanced as shown in FIG. 1, the clutch collar is fixed in its intermediate or neutral position in which its respective clutch jaws 26 and 27 are entirely free of driving engagement with the complementary jaws 28 and 29 of the respective gears 12 and 13. If, at the time the plunger 41 was advanced to the position in which it appears in FIG. 1, the clutch collar 25 was in either of the forward or reverse driving positions illustrated in FIGS. 3 and 4, the entry of the ball 46 at the end of plunger 41 into the path of the respective cam surfaces 33 or 35 would effect camming action of the beveled surface 33 or 35, as the case might be, with the advanced ball 46 of plunger 41 to cause the collar to be shifted from its engaged position to the disengaged or neutral position of FIG. 1.

As previously indicated, a very slight amount of pressure is required to reciprocate the slide 50, since the only work accomplished in the movement of slide 50 is to advance or retract the several plungers 40, 41, 42. As one means of remote control of the position of slide 50, I have shown a conventional Bowden wire 54 connected to the slide 50 for this purpose. It will be understood to be broadly immaterial to the invention what remote control means are used to actuate the slide, or whether these are mechanical pneumatic, electrical or otherwise.

With an assumed direction of rotation of shaft 15 and an assumed pitch of a propeller mounted on driven shaft 17 (not illustrated), FIG. 4 shows the parts as they appear for "forward" operation of the driven shaft. The slide 50 has been moved upwardly from the FIG. 1 position to that of FIG. 4 to register the offset portion 52 of cam slot 51 with the cam follower roller 49 on plunger 40, thereby advancing this plunger. Both of the other cam followers rollers 49 of plungers 41 and 42 are in the straight portions of the cam slot 51 so that plungers 41 and 42 are in the retracted position illustrated in FIG. 4.

In the advanced position of the plunger 40, its ball head 46 has been moved into the path of the outwardly beveled surface 32 of the peripheral flange 39 with the result that the clutch collar 25 has been moved axially of shaft 15 on its splines 55 to engage its clutch jaw 27 with complementary clutch jaw 29 of the gear 13.

If the slide 50 is moved downwardly rather than upwardly from the position of FIG. 1, the offset portions 52 of its cam slot 51 will be registered with the roller 49 of plunger 42 to advance plunger 42 as shown in FIG. 3. The rollers 49 of plungers 40 and 41 will be in the straight portions of cam slot 51 and these plungers, therefore, will be retracted. The advance of the ball head 46 of the actuated plunger 42 has moved this into the path of the outwardly beveled face 34 of peripheral flange 31 of clutch collar 25 whereby the clutch collar has been actuated upwardly to engage its jaw 26 with the complementary jaw 28 of gear 12, the result being to clutch gear 12 to the drive shaft 15 thereby operating driven shaft 17 in a direction assumed to be a reverse direction for the purposes of this disclosure.

It is desirable to make the various positions of the slide 50 tactually apparent even at a distance by means of some device such as the impositive detent 60, which also secures the slide against accidental displacement without offering any great resistance to its manual operation. Detent 60 is subject to the bias of a light spring 61 and is selectively engageable in the notches 62, 63 and 64 provided in the slide.

FIG. 5 shows a position in which all of the plungers 40, 41 and 42 are retracted, the offset portion 52 of the cam slot 51 of slide 50 being located midway between the cam follower rollers 49 of the plunger 40 and 41. Thus, all three of the cam follower rollers are aligned in straight portions of the slide and none of the plungers is advanced. The detent 60 is shown in a position intermediate two of the notches which normally receive it. In this position of the parts, the clutch collars 25 is obviously free to assume any position it desires. Normally, it will be provided with light springs such as those shown at 65 and 66 which tend to maintain it centered. However, it is optional whether the springs be used, as it may be desired that, in the absence of any manual control, the collar 25 should assume one or another of its engaged positions, biased either by a single spring or by gravity.

It will, of course, be understood that the invention in its generic aspect uses power of the constantly operating shaft 15 to engage or disengage a clutch. It is, therefore, broadly immaterial to the generic invention whether the device includes a second clutch and is designed as a reverser.

I claim:

1. A power operated manually controlled clutch including driving and driven elements coaxially mounted, a clutch collar splined to and axially movable on one of the elements, said clutch collar and the other element having complementary clutch teeth engageable and disengageable upon the axial movement of the collar upon the element to which it is splined, oppositely disposed cam means upon the collar, cam follower plungers having means mounting them for movement toward and fro advanced and retracted positions with respect to the collar, said plungers having cam follower portions positioned for interaction with cam means on the collar when the respective plunger is advanced toward the collar, such interaction effecting axial movement of the collar upon the element to which it is splined for respectively engaging and disengaging the clutch teeth of the collar with the teeth of the other element, means for controlling the position of the plungers including a slide reciprocable substantially parallel to the axis of said elements, said slide including spaced margins defined by a cam slot having a portion offset toward said axis and said plungers having laterally projecting studs engaged in said slot, the plungers being advanced and retracted by said slide according to the position of respective studs in said slot, and remote means for reciprocating said slide.

2. A clutch according to claim 1 in which the respective studs of respective plungers have rollers disposed in the slot and closely confined between the said margins, and respective plungers have rollers rotatably mounted at their ends and positioned to be engaged by respective cam means on said collar when the respective plunger is advanced by engagement of its roller by a margin of said slide at the offset portion of said slot.

3. A power operated manually controlled reverser including a driving shaft, a pair of driving gears coaxial with the shaft and spaced axially thereof and normally free thereof, a driven gear meshing with the driving gears, a clutch collar splined to the shaft and reciprocable axially of the shaft between the driving gears, said clutch collar and the driving gears having complementary teeth selectively engageable in the extreme positions of reciprocation of the collar, cam flanges mounted on the collar in mutually spaced relationship and having opposed axially offset camming portions, two of which converge centrally of the collar and two of which diverge toward the ends of the collar, a set of three camming plungers provided with means guiding them for advance and retraction to and from said shaft, each of said plungers having a cam follower head engageable with one of said flanges in the advanced position of the plunger toward the axis of said shaft, such engagement resulting in displacement of the collar for controlling the clutching engagement of its teeth with respective gears, and means for selectively advancing the respective plungers singly from retracted positions to advanced positions in the path of the flanges of the collar, said last mentioned means comprising a slide reciprocable substantially parallel to the axis of the shaft and provided with a cam slot extending generally parallel to the shaft axis and having at an intermediate point an offset toward such axis, the axial extent of the offset being no greater than the distance between two plungers, the plungers having laterally projecting studs engaged in said slot, whereby registry of the offset portion of the slot with a given stud will advance a respective plunger toward the axis of said shaft.

4. A reverser according to claim 3 in which the cam follower heads of the respective plungers comprise rollers rotatably mounted at the ends of the plungers and the studs of respective plungers have rollers rotatably mounted thereon and disposed in the slot of said slide and engaged by the marginal portions of the slide at opposite sides of such slot.

References Cited in the file of this patent

UNITED STATES PATENTS

| | | |
|---|---|---|
| 818,662 | Buffum | Apr. 24, 1906 |
| 952,664 | Allen | Mar. 22, 1910 |
| 1,193,008 | Fuller | Aug. 1, 1916 |
| 1,760,710 | Mitchell | May 27, 1930 |
| 2,086,496 | Geldhof | July 6, 1937 |
| 2,192,439 | Gustafson | Mar. 5, 1940 |
| 2,519,117 | Curtis | Aug. 15, 1950 |